(12) United States Patent
Simon (10) Patent No.: US 7,013,185 B2
(45) Date of Patent: Mar. 14, 2006

(54) FIELD DEVICE FOR AUTOMATION SYSTEMS

(75) Inventor: René Simon, Magdeburg (DE)

(73) Assignee: IFAK Institut Fuer Automation und Kommunikation E.V. Magdeburg, Barleben (DE)

( * ) Notice: Subject to any disclaimer, the term of this patent is extended or adjusted under 35 U.S.C. 154(b) by 117 days.

(21) Appl. No.: 10/450,285

(22) PCT Filed: Dec. 13, 2001

(86) PCT No.: PCT/EP01/14663

§ 371 (c)(1),
(2), (4) Date: Oct. 9, 2003

(87) PCT Pub. No.: WO02/48809

PCT Pub. Date: Jun. 20, 2002

(65) Prior Publication Data

US 2004/0030422 A1    Feb. 12, 2004

(30) Foreign Application Priority Data

Dec. 14, 2000   (DE) ................ 100 63 982

(51) Int. Cl.
*G05B 11/01* (2006.01)
(52) U.S. Cl. .......................... 700/19; 700/83
(58) Field of Classification Search ........... 700/19, 700/83, 1, 8, 96
See application file for complete search history.

(56) References Cited

U.S. PATENT DOCUMENTS

| 5,963,444 A | 10/1999 | Shidara et al. |
| 6,094,600 A | 7/2000 | Sharpe et al. |
| 6,101,422 A | 8/2000 | Furlong |
| 6,233,626 B1 * | 5/2001 | Swales et al. ............. 710/11 |
| 6,671,686 B1 * | 12/2003 | Pardon et al. ............. 707/8 |
| 6,788,980 B1 * | 9/2004 | Johnson ................... 700/1 |

FOREIGN PATENT DOCUMENTS

| DE | 42 07 158 A1 | 10/1992 |
| DE | 298 21 808 U1 | 2/2000 |
| DE | 198 57 332 C1 | 6/2000 |
| DE | 100 04 426 A1 | 8/2001 |

* cited by examiner

*Primary Examiner*—Leo Picard
*Assistant Examiner*—Alexander J. Kosowski
(74) *Attorney, Agent, or Firm*—Marshall & Melhorn, LLC (57) ABSTRACT

The invention relates to a field device for automation systems, comprising a unit for internal data organisation, means for recording process parameters and/or means for outputting regulation parameters, means for processing signals according to the recorded regulation parameters or the regulation parameters to be output, and at least one communication interface. The means and the communication interface thus communicate with a unit for internal data organisation in order to exchange data between each other. A transaction manager unit, which is provided to control blockings, transactions and/or users, is used to control the access via the means and via the at least one communication interface to the data of the unit for internal data organisation between the means, the at least one communication interface and the unit for internal data communication.

12 Claims, 6 Drawing Sheets

FIELD DEVICE FOR AUTOMATION SYSTEMS

BACKGROUND OF THE INVENTION

The invention relates to a field device for automation systems of the type of the main claim.

In automation systems, field devices are used which serve for example to record process parameters and/or to influence regulation parameters and which are connected via one or more interfaces to other field devices or to higher planes of the automation system. Generally the field device comprises a unit for internal data organisation, one or more communication interfaces (1-n), one or more process interfaces (1-n), (0-n) man-machine interfaces, elements for signal processing and (0-n) persistent memories, the interfaces, the elements for signal processing and the persistent memory having access to data in the unit for internal data organisation. The expressions in brackets give the number of the respective elements, but obviously a field device can contain other constituent parts, such as power supply, mechanical elements and the like.

The unit for internal data organisation as well as the persistent memory contain the process image with process variables, configuration parameters for communication, the program or programs to be used, stored fixed values of the parameters used in the process image or the like. The process interfaces record the measured variables or respectively give the regulation parameters for the automation process; the elements for signal processing, which are configured for example as functional components, process the measured variables and/or regulation parameters, and the communication interfaces, which can be configured for bus systems, serve to communicate with other devices. The man-machine interfaces are realised for example by a local control display or a local input unit or by switches. The unit for internal data organisation and the persistent memory are formed by a microprocessor system. All the data-processing components of the field device, i.e. all the interfaces, and the signal processing work on the internal data organisation, i.e. they read and write the data stock there.

Field devices are used in all the fields of automation, e.g. process industries, such as the chemical industry, power stations or in manufacturing industries, such as vehicle construction. These devices are for example sensors (pressure, temperature, filling level, . . . ), actuators (valves, converters, motors, . . . ) and more.

As an example of a simple field device can be quoted a sensor for measuring concentrations which comprises a vibrating quartz crystal, an oscillator, a microprocessor system having memories and timing circuits and the like, as well as a serial interface and a power supply for all the elements. Here the vibrating quartz crystal represents the process interface; it detects additions of mass by the alteration of an oscillation frequency and converts it into an electrical signal. The signal processing is carried out via the oscillator and the microprocessor system, the latter also representing the internal data organisation and the persistent memory as well as, together with the serial interface, the communication interface. In the described example there is no man-machine interface. The vibrating quartz crystal detects the addition of mass and the concentration is determined, the concentration value being capable of being transmitted via the serial interface to other components of the automation system, or regulation parameters can be calculated in the concentration sensor itself and these parameters can be transmitted to actuators via the interface.

In principle, the data and functions of field devices in automation systems are used by other field devices or other automation components; these are e.g. installation tools, tools for service/maintenance, control systems, stored program controls, other field devices, ERP systems, MES systems and more (ERP—Enterprise Resource Planning; MES—Manufacturing Execution System).

When field devices are used there are a number of problems which are described below, the problems arising both through external users, i.e. through other components of the automation system, and through internal users. A user has access via the constituent parts of the field device to its internal data organisation. Internal users are the described constituent parts of the field device. External users are automation components or their constituent parts or other field devices or their constituent parts or constituent parts of the process in an automation system which are connected to the field device via the communication, process or man-machine interfaces. User access can be triggered by the automation system itself, by people using it or by the process to be automated.

Inconsistencies due to simultaneous reading/writing of a datum of the internal data organisation by a plurality of users, e.g.

more than one communication (e.g. Ethernet and any field bus), cyclic and acyclic communication (e.g. in the PROFIBUS cyclic via C1 connection and acyclic via C2 connection)

local control display and communication via the communication interface, any other combinations of the above-described data-processing components.

Inconsistency due to reading/writing of logically associated data of the internal data organisation by one user in a plurality of steps (e.g. measured value plus status or lower and upper limit values or measured value and unit or set of parameters), e.g.

acyclic in a plurality of telegrams (e.g. Ethernet, PROFIBUS), partially cyclic, partially acyclic (e.g. PROFIBUS).

Lack of the possibility of producing a defined original state in carrying out a plurality of writing/reading operations in sequence, when the user requires this, e.g.:

reconfiguration, downloads (e.g. from functional components or of all the parameters of the field device uploads (e.g. of all the parameters of one or more field devices)

downloads into a plurality of field devices.

Lack of consistency of the internal data organisation of a field device with data organisations of other field devices data organisations of automation components.

When practical automation tasks are solved with the aid of field devices, the above-mentioned problems occur in any combinations. The solution for the described problems therefore becomes more urgent since field devices are no longer used only in isolation or connected for communication 1:1, but to an increasing extent permit communication with a plurality of users. The increasing integration into higher planes of automation technique (e.g. for asset management) contributes to this.

SUMMARY OF THE INVENTION

The object underlying the invention, therefore, is to create a field device for automation systems, with which device conflicts in simultaneous parallel access to the internal data organisation are avoided.

This object is accomplished according to the invention by the characterising features of the main claim in conjunction with the features of the preamble.

Because a transaction manager unit, which manages blockings, transactions and/or other users, is provided in the field device to control the access by the means for recording process parameters and/or for outputting regulation parameters and the means for signal processing and by the at least one communication interface to the data of the unit for internal data organisation, between the means as well as the at least one communication interface and the unit for internal data organisation, many problems in the access to the data can be prevented, in particular access can be made without any problem to data which is changed in parallel, which is not released, which is inconsistent. Furthermore losing the changes is avoided, and it is made possible to ensure consistent states, or respectively to return to same.

Through the measures quoted in the subordinate claims, advantageous development and improvements are possible. It is particularly advantageous that the transaction manager unit comprises a transaction/service entity, which uses and makes available at least one transaction protocol, through which the propagation of transactions with other transaction managers is rendered possible and thus distributed transactions are permitted.

BRIEF DESCRIPTION OF THE DRAWINGS

An embodiment of the invention is represented in the drawing and is explained in greater detail in the following description. The figures show.

DESCRIPTION OF THE PREFERRED EMBODIMENTS

Figure 1:
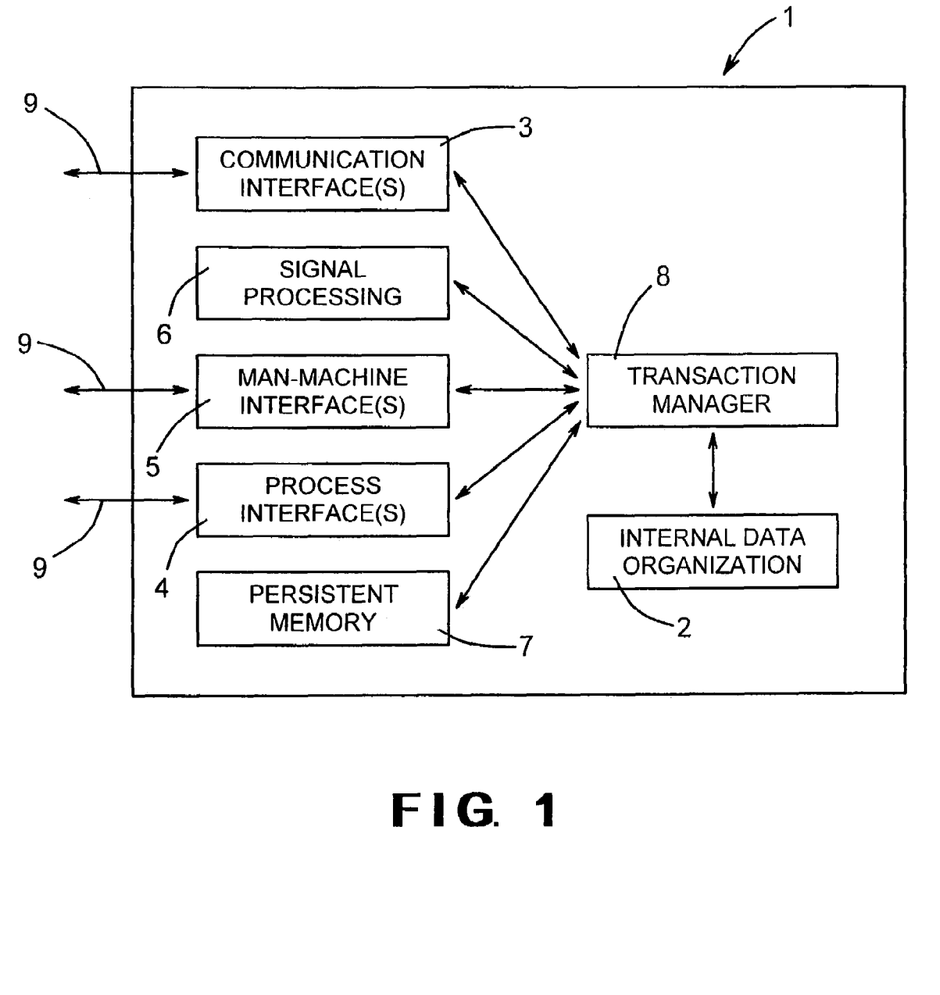
FIG. 1 a diagrammatic view of the structure of a field device.

The field device 1 represented in FIG. 1 comprises, as has already been described in connection with the prior art, a unit for internal data organisation 2, at least one communication interface 3, at least one process interface 4, at least one man-machine interface 5, means for signal processing 6 and a persistent memory 7. Between the individual constituent parts 3 to 7 and the unit for internal data organisation 2 is connected a transaction manager unit 8, which controls the data access of constituent parts 3 to 7 to the internal data organisation 2.

Both internal users, which can be the constituent parts 4 to 7 of the field device, and external users, which can communicate via the indicated double-headed arrows 9 of the communication interface 3, of the man-machine interface 5 and of the process interface 4, have recourse to the transaction manager unit 8.

The transaction manager unit 8 has a plurality of management functions, which are deposited for example in table form or the like in a microprocessor system. These management functions include the management of users, the management of blockings and the management of transactions. The management of users includes the introduction and removal of users, the allocation of rights for the individual users and ensuring the rights are maintained. Naturally further user-specific management processes which are not listed are possible.

Under the management of blockings falls for example the requesting and release of blockings, the allocation of blockings to data or objects of the internal data organisation, the definition of the blockings e.g. exclusive blockings, for example for reading and writing, or divided blockings, for example for reading, as well as ensuring the maintenance of blockings.

The transactions managed by the transaction manager unit relate to transactions which are based on blockings, initiation, breaking-off, i.e. the rejection of the results, terminating, i.e. the confirmation of the results, the allocation of blockings, access to objects of the internal data organisation, ensuring at least two-phase transactions and other synchronisation mechanisms, e.g. its versioning of objects, time stamp. A transaction ensures the consistency of the internal data organisation via a non-interruptible sequence of access to its objects.

Figure 2:
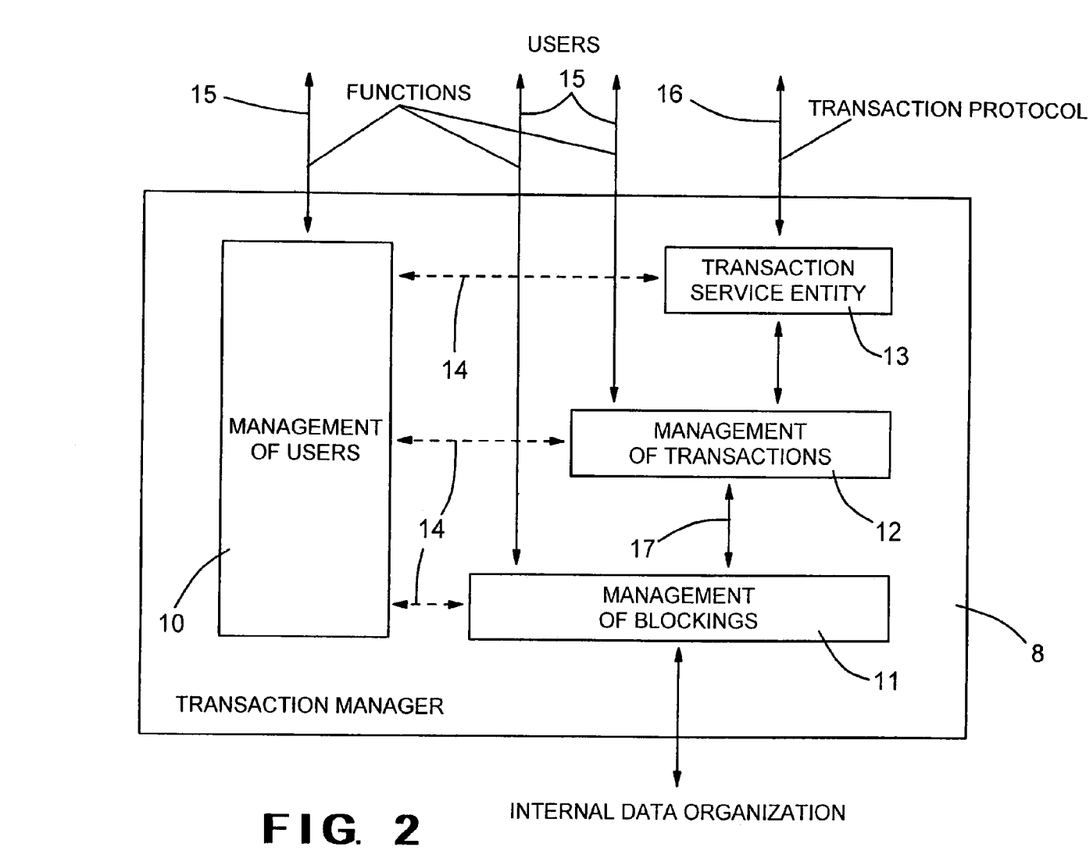
FIG. 2 the internal structure of the transaction manager unit.

FIG. 2 shows the internal structure of the transaction manager unit which is realised as a microprocessor system. The individual constituent parts or units of the transaction manager are the management of users 10, the management of blockings 11, the management of transactions 12 and in addition a transaction service entity 13 is provided. The units management of blockings 11, management of transactions 12, transaction service entity 13, are arranged in layers the one above the other and lie on the internal data organisation, whilst the user management 10 is arranged vertically and cooperates with units 11 to 13 according to the double-headed arrows 14 shown in broken lines. The individual internal users can have direct access to the above-listed functions of the individual units 10, 11, 12, which is indicated by the double-headed arrows 15. Internally, the management of transactions 12, the management of blockings 11, if desired and preset, fall back on the management of users 10 in order to call up the various functions of the management of users 10.

The functions which are mapped on the communication protocols used in each case are made available by suitable services/protocols to external users which have access via the communication interface(s) 3.

The transaction service entity 13 is provided to render possible the coordination with other transaction managers via a transaction protocol. This transaction protocol, which is for example the Transaction Internet Protocol (TIP), is stored in the transaction manager 8 or respectively in the microprocessor system, the transaction service entity transforming or mapping the data arriving and leaving, as indicated by the double-headed arrow 16, according to the rules of the transaction protocol. The transaction protocol will be mapped for communication with other transaction managers onto the communication protocol or protocols used. Through the possible coordination, distributed transactions can be realised, and the propagation of transactions with other transaction managers is rendered possible.

Figure 3:
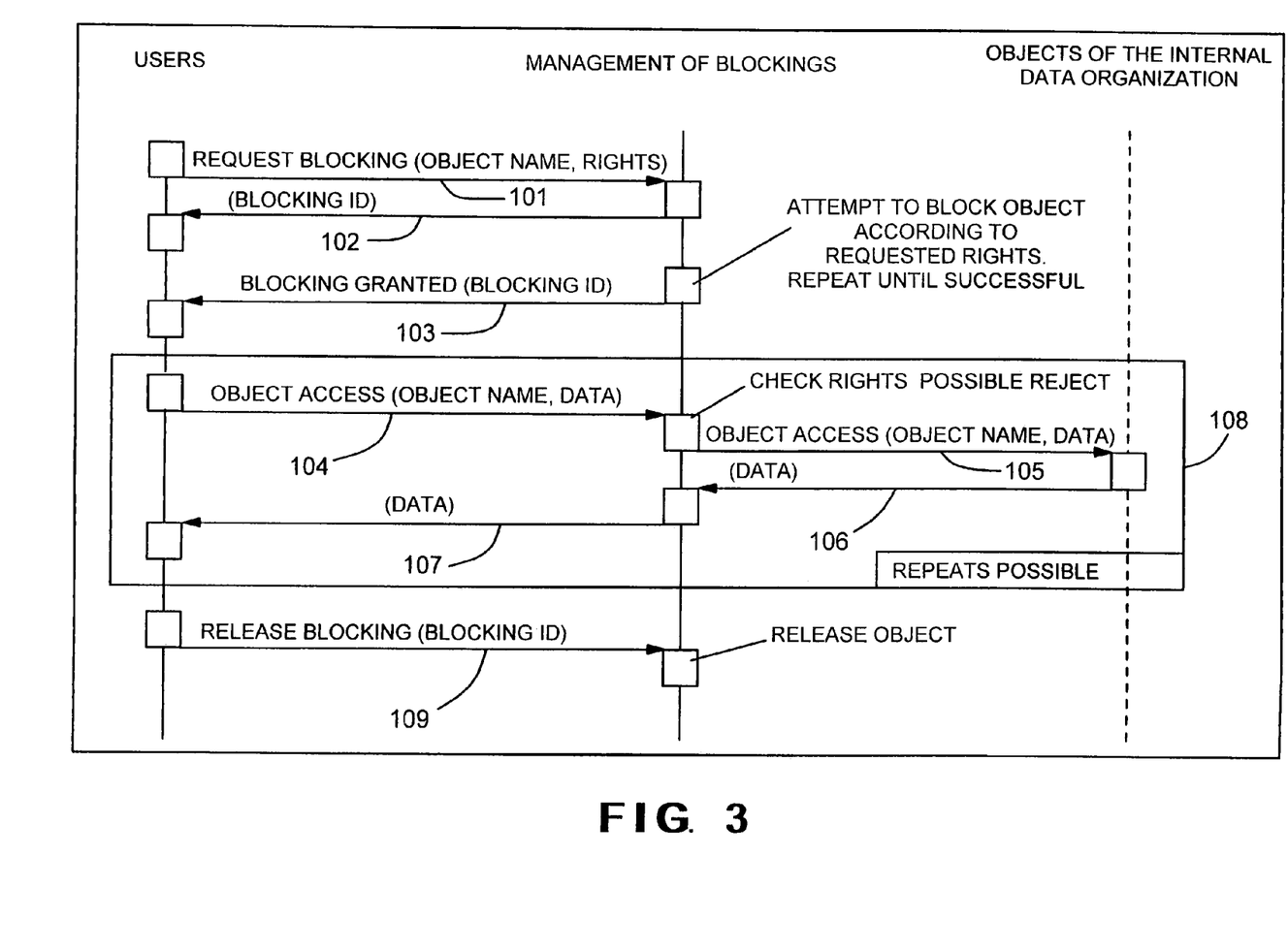
FIG. 3 a sequence chart for the interaction of a user with the transaction manager unit using the management of blockings, FIGS. 4A & 4B a sequence chart for the interaction of the user with the transaction manager unit, using the management of transactions and the management of blockings, and FIG. 5 the structure of an automation system with a field device and automation components.

FIG. 3 shows a first sequence chart, which shows for example the interaction of a user with the transaction manager unit 8, unit 11 being used to manage blockings. The management of users 10 is not represented explicitly, the management of transactions 12 or the transaction service entity 13 is not used.

In this example according to FIG. 3, a blocking is requested on an object of the internal data organisation 2 with specific rights, by a user according to step 101. Here the name of the object and the type of rights are supplied to the unit for managing blockings 11 by the user or respectively by the management of users. For example an external user has access via the man-machine interface 5, the object being the unit for temperature (Celsius, Kelvin) and the blocking being the reading and writing.

Due to the request according to step 101, a blocking is produced and its blocking ID is passed back to the user according to step 102. In the management of blockings 11, an attempt is made to block the object according to the requested rights and this process is repeated until it is successful. If it has been possible to block the object, which can take some time depending on blockings for other users, the user is informed about this according to step 103, i.e. a confirmation "blocking", issued in conjunction with the blocking ID, is supplied to the user. Thereafter access by the user to the object is possible by the user and the name of the object or respectively the data is supplied to the management of blockings 11 according to step 104, which checks the rights and if they do not agree possibly rejects them. Then the object access according to step 105 is passed on to the internal data organisation 2, which supplies the data via step 106 to the management of blockings 11, which in turn passes the data on to the user with step 107. The actual object access, which is indicated by box 108, can be repeated several times. On conclusion of the access to the object, the user releases the blocking, according to step 109.

Figure 4A:
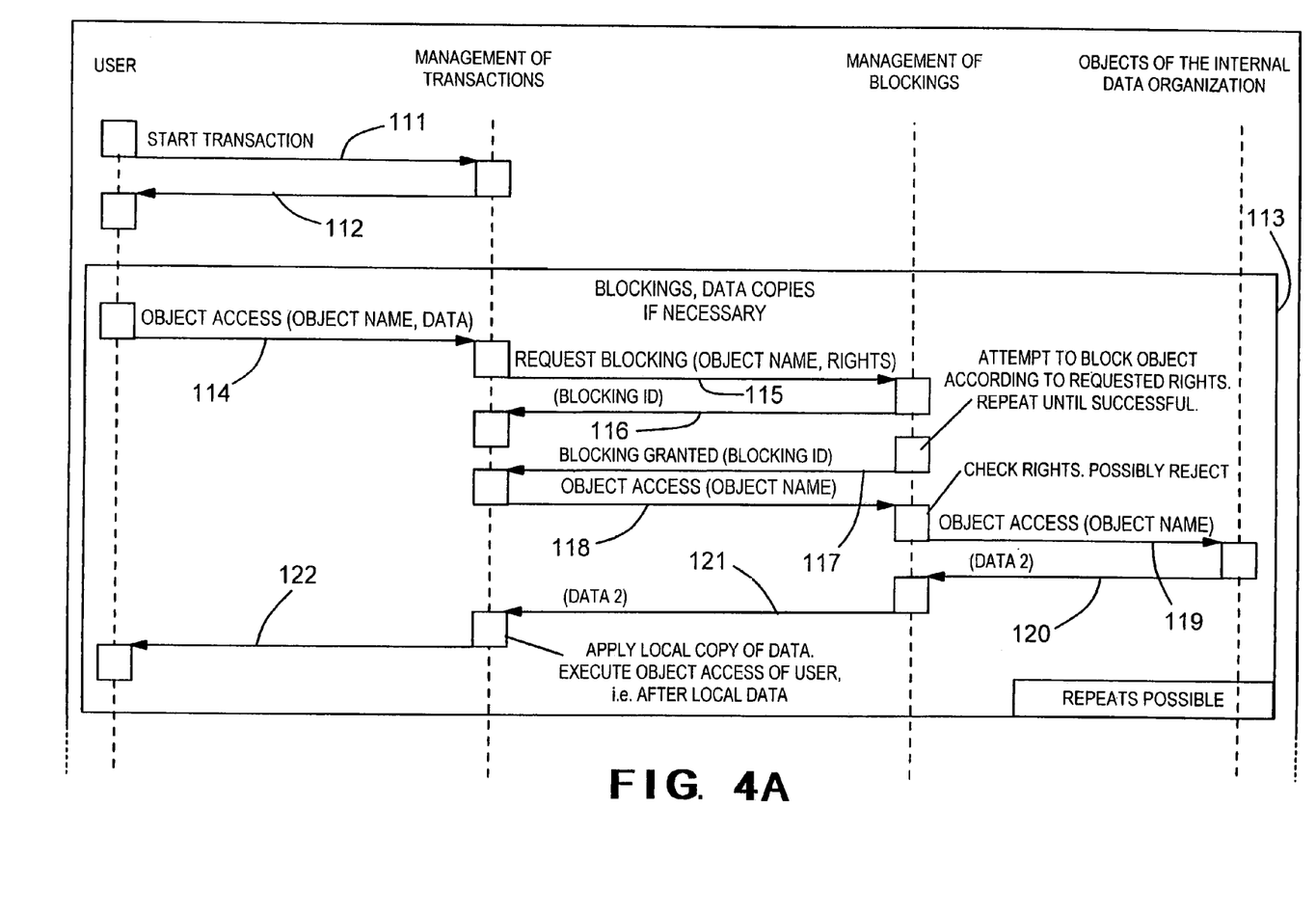
Figure 4B:
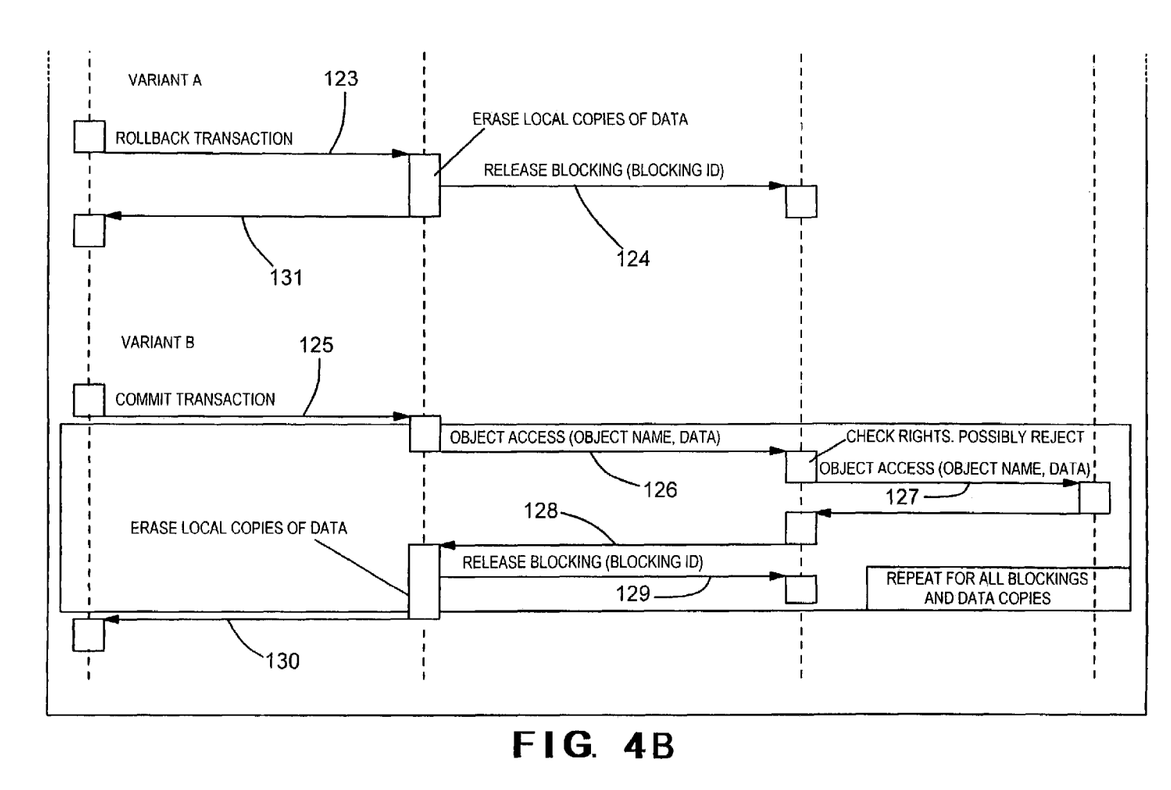

A further example of a sequence chart is shown in FIGS. 4A & 4B, which show for example the interaction of a user with the transaction manager unit, the management of transactions being used. The management of users is not explicitly shown and the management of blockings only used internally, i.e. the path designated in FIG. 2 by the double-headed arrow 17 between the unit for managing transactions 12 and the unit for managing blockings 11 is used. The transaction service entity 13 is not used. The object access requested by the user is in this example the writing of data.

In this example, a transaction is started by a user, which corresponds to step 111 between the user or respectively the user management and the management of transactions. Step 112 represents the response. The steps 115 to 121 represented in box 113 correspond substantially to steps 101 to 107 of FIG. 3, with the exception that the steps go from the unit for the management of transactions and not from the user or from the user management itself. Step 114 represents the request for object access between the user and the management of transactions. In summary it can be said that after the start of the transaction by a user, this object access is carried out, namely writing, as represented in FIGS. 4A & 4B, the reading being analogous. With each object access a check is made as to whether the request of blockings (115) is necessary and this is possibly done (117). In addition, a check is made as to whether the introduction of local data copies is necessary, e.g. if data could potentially be changed. In the embodiment according to FIGS. 4A & 4B, a local copy of the data (121) requested from the internal data organisation is deposited in the unit for managing transactions. Furthermore, the object access of the user, i.e. the writing or alteration of local data is carried out and the execution of this is notified to the user via step 122.

In variant A, the user decides to break off the transaction. Thus the local data copies (123, 124) are removed and all the blockings are released. The user is informed about the outcome that its data access has been rejected (131).

According to variant B, the user decides to hand over the transactions (step 125). Thus the local data copies in the unit for managing transactions are stored in the internal data organisation device 2 via the unit for managing blockings, and removed locally (128) as well as, according to step 129, all the blockings being released. Step 130 notifies the removal of the blockings back to the user.

Figure 5:
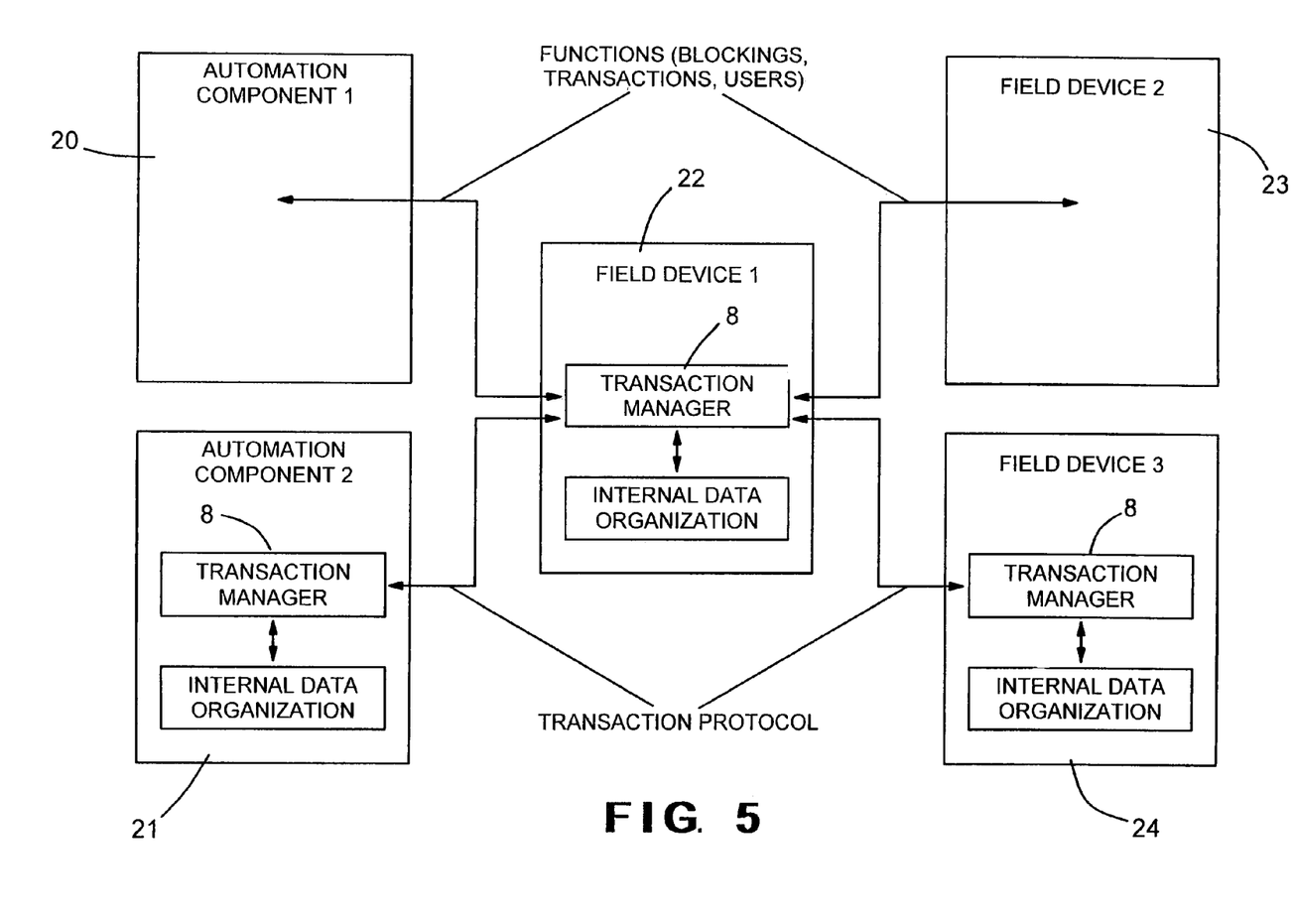

In FIG. 5 is represented an example of an automation system which comprises two automation components 20, 21 and three field devices 22, 23, 24, one automation component being a device which uses the data and functions of field devices in order to meet the tasks allocated to it within the framework of an automation system. It is realised by hardware and software.

An automation component fulfils tasks such as serving, observing, regulation, control, archiving, asset management and many other tasks. A typical example is a PC or work station-based process control system in the control room.

An automation component is connected via communication systems to other automation components and field devices.

Automation components 21 and field devices 22, 24 here have a transaction manager 8.

Automation component 20 uses the functions of the transaction manager 8 of the field device 22 (blockings, transactions, users). Automation component 21 uses the transaction protocol in order to synchronise its internal transaction manager 8 with that of the field device 22 (distributed transactions), the transaction protocol being mapped for this purpose onto the communication protocol.

Field device 23 uses the functions of the transaction manager of field device 22 (blockings, transactions, users). Field device 24 uses the transaction protocol in order to synchronise its internal transaction manager 8 with that of field device 22 (distributed transactions).

Automation components and field devices can be in an m:n relationship to one another. Different versions can occur together in one automation system.

Due to the introduction of the transaction manager and of the transaction protocol in field devices, the problems which were described initially can be solved. Inter alia, the following causes of faults are prevented:
access to data which is changed in parallel
access to data which is released
access to data which is inconsistent
loss of changes.

Furthermore it is made possible:
to ensure consistent states or respectively to return to same,
to generate consistency beyond the individual field device.

The invention claimed is:

1. A field device for automation systems, comprising:
a unit for internal data organization,
means for recording process parameters and/or means for outputting regulation parameters,
means for processing signals according to the recorded process parameters or the regulation parameters to be output, and
at least one communication interface, wherein the means for recording process parameters and/or the means for outputting regulation parameters, the means for processing signals and the communication interface are communicating with the unit for internal data organization for the exchange of data between them, wherein a transaction manager unit is provided between the means for recording process parameters and/or the means for outputting regulation parameters, the means for processing signals, the at least one communications interface and the unit for internal data organization, said transaction manager unit managing blockings and at least one of transactions and users to control access by the means for recording process parameters and/or the means for outputting regulation parameters, the means for processing signals, and the at least one communication interface to the data of the unit for internal data organization.

2. The field device according to claim 1, wherein the transaction manager unit comprises a transaction service entity which makes available at least one transaction protocol for coordinating the transactions with other transaction manager units.

3. The field device according to claim 2, wherein the transaction protocol is the Transaction Internet Protocol.

4. The field device according to claim 2, wherein the propagation of transactions with other transaction manager units and distributed transactions can be realized via the transaction protocol of the transaction service entity.

5. The field device according to claim 2, wherein the transaction protocol can be mapped onto other communication protocols which are used by the at least one communication interface.

6. The field device according to claim 2, wherein the functions: manager of blockings, manager of transactions and/or manager of users are made available to the at least one communication interface or the users of the at least one communication interface directly or via the transaction protocol of the transaction service entity by mapping onto the communication protocol used by the interface.

7. The field device according to claim 1, wherein the unit management of blockings, the unit management of users and/or the transaction service entity of the transaction manager unit lie in layers and the unit management of users is arranged vertically.

8. The field device according to claim 1, wherein at least one interface is provided for manual input and/or for the output of display data.

9. The field device according to claim 1, wherein the transaction manager unit has means for ensuring at least two-phase transactions.

10. A field device for automation systems, comprising:
a unit for internal data organization,
means for recording process parameters and/or means for outputting regulation parameters,
means for processing signals according to the recorded process parameters or the regulation parameters to be output, and
at least one communication interface,
wherein the means for recording process parameters and/or the means for outputting regulation parameters, the means for processing signals and the communication interface are communicating with the unit for internal data organization for the exchange of data between them,
wherein a transaction manager unit is provided between the means for recording process parameters and/or the means for outputting regulation parameters, the means for processing signals, the at least one communications interface and the unit for internal data organization, said transaction manager unit managing blockings and at least one of transactions and users to control access by the means for recording process parameters and/or the means for outputting regulation parameters, the means for processing signals, and the at least one communication interface to the data of the unit for internal data organization,
wherein the transaction manager unit manages transactions based on at least one of: blockings, initiations, rejection of results, confirmation of results, allocation of blocking, access to objects of the internal data organization, ensuring at least two-phase transactions and other synchronization transactions.

11. The field device according to claim 10, wherein transactions managed by the transaction manager ensure the consistency of internal data organization via a non-interruptible sequence of access to its objects.

12. A field device for automation systems, comprising:
a unit for internal data organization,
means for recording process parameters and/or means for outputting regulation parameters,
means for processing signals according to the recorded process parameters or the regulation parameters to be output, and
at least one communication interface,
wherein the means for recording process parameters and/or the means for outputting regulation parameters, the means for processing signals and the communication interface are communicating with the unit for internal data organization for the exchange of data between them,
wherein a transaction manager unit is provided between the means for recording process parameters and/or the means for outputting regulation parameters, the means for processing signals, the at least one communications interface and the unit for internal data organization, said transaction manager unit managing blockings and at least one of transactions and users to control access by the means for recording process parameters and/or the means for outputting regulation parameters, the means for processing signals, and the at least one communication interface to the data of the unit for internal data organization,
wherein transactions managed by the transaction manager ensure the consistency of internal data organization via a non-interruptible sequence of access to its objects.

* * * * *